United States Patent Office 3,842,136
Patented Oct. 15, 1974

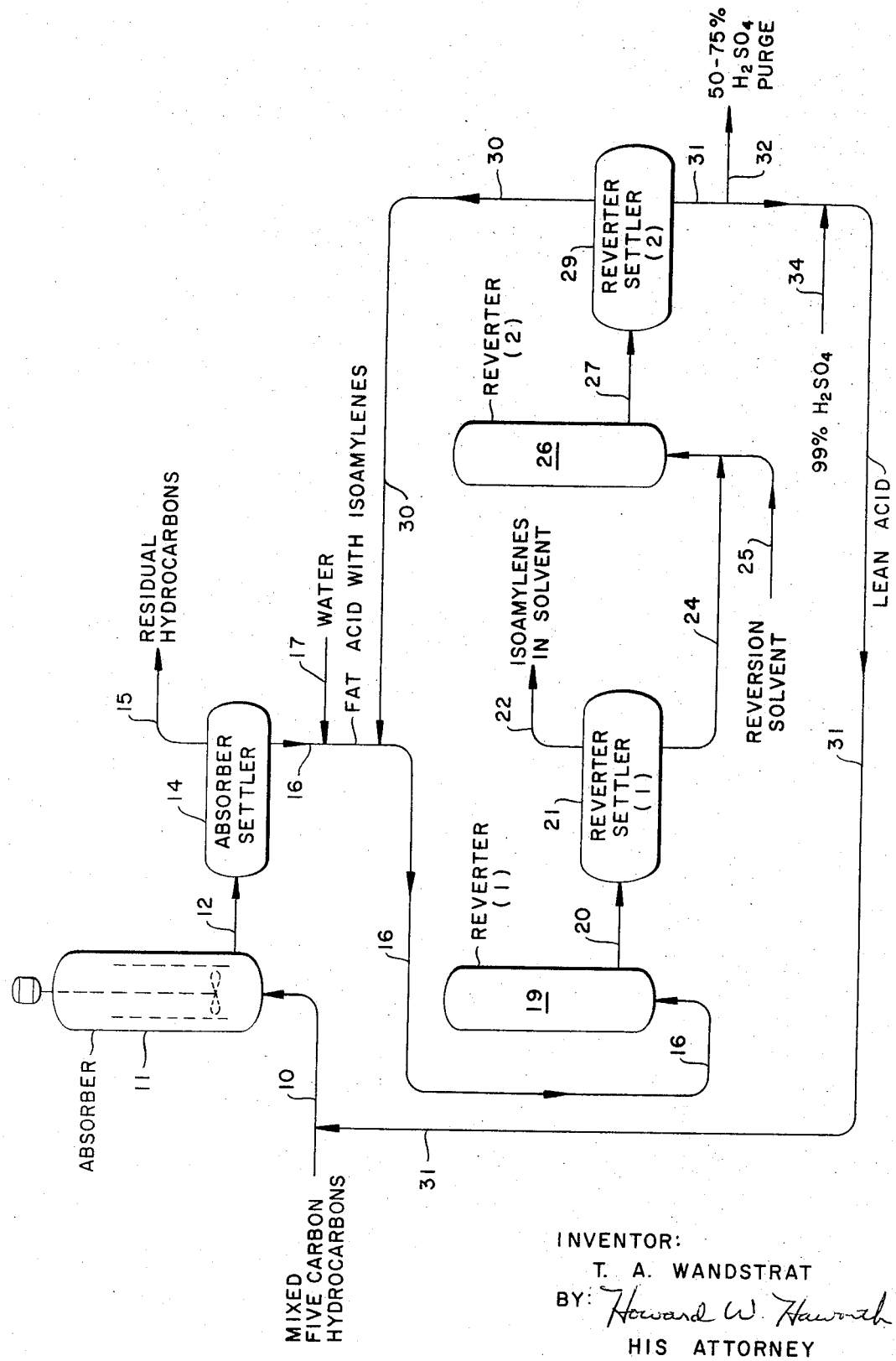

3,842,136
ISOAMYLENE EXTRACTION
Theodore A. Wandstrat, Houston, Tex., assignor to Shell Oil Company
Continuation-in-part of abandoned application Ser. No. 158,331, June 30, 1971. This application May 10, 1973, Ser. No. 359,161
Int. Cl. C07c 11/00
U.S. Cl. 260—677 A
3 Claims

ABSTRACT OF THE DISCLOSURE

Improved isoamylene extraction is achieved with sulfuric acid absorption processes when the components of diluted make-up acid are added in two steps: (1) as a concentrated acid addition to the lean recycle acid and (2) as a water addition to the fat acid extract.

This application is a continuation-in-part of application Ser. No. 158,331, filed June 30, 1971, now abandoned.

Background of the Invention

Field of the Invention: This invention relates to an improved method for separating and recovering isoamylenes from a hydrocarbon stream consisting mainly of 5 carbon atom hydrocarbons which include saturates, monoolefins and diolefins.

The Prior Art: It is generally known in the art that isoamylenes can be separated from a 5 carbon hydrocarbon stream by contacting the stream in an absorption zone with sulfuric acid of 50–75% by weight concentration at low temperatures. Isoamylenes are selectively absorbed into the acid phase. The isoamylenes can be recovered from the isoamylene-fat acid phase in a reversion zone by extraction with a suitable reversion solvent under appropriate conditions. A typical process of this type is described in U.S. Pat. 3,250,820, issued May 10, 1966, to R. G. Duthie. This process has been studied in great depth and continuous designs have been achieved which operate with very high thermal and chemical efficiency. In all designs, however, there is a continuous purging and replacement of the sulfuric acid extractant. If this is not done, contaminants build up in the acid phase which prevent efficient extraction and phase separation. The acid which is purged is of 50–75% by weight concentration. The acid being added initially is usually much more concentrated, generally containing 99.5% by weight or more sulfuric acid. This concentrated acid must be diluted before addition, or water must be added along with the acid to maintain a constant acid phase composition. Conventionally, little attention has been paid to where and how the acid and diluting water are added. In conventional designs the two materials are added together at the same point in the system, usually to the stream of lean acid being recycled from the reversion zone to the absorption zone.

Statement of the Invention

It has now been found that improved efficiency is realized in continuous sulfuric acid absorption processes for the separation of isoamylenes from a stream mainly containing 5-carbon atom hydrocarbons when the components of make-up acid are added in a special manner. In accordance with this invention, improved isoamylene recoveries are obtained when the components of make-up acid are added as two separate streams to two separate locations, concentrated sulfuric acid being added to the stream of lean acid recycled to the absorption zone from the reversion zone and water being added to the stream of fat acid as it passes from the absorption zone to the reversion zone.

Brief Description of the Drawing

The invention will be described with reference to the single figure of the accompanying drawing which illustrates a simple flow diagram of one embodiment of this invention.

Detailed Description of the Invention

Turning first to the figure, the improvement of this invention can clearly be seen. The figure illustrates a flow diagram of a simple single step absorber-double stage reverter isoamylene recovery unit.

A stream consisting essentially of five carbon hydrocarbons is obtained. Such a stream contains isoamylenes as well as close-boiling hydrocarbons such as pentadienes and pentanes and up to about 20% by weight of four, six and higher carbon atom hydrocarbons. Such a stream is commonly prepared from a hydrocarbon stream containing cracked material. This stream is passed through conduit 10 to absorber 11. Sulfuric acid is also introduced into absorber 11 from conduit 31 via conduit 10. Absorber 11 is equipped with a draft tube or other equivalent mixer which intimately contacts the acid and hydrocarbon streams. The mixture of acid and hydrocarbon is removed from the absorber via conduit 12 to absorber settler 14 where the mixture separates into a residual hydrocarbon raffinate phase containing the nonextracted hydrocarbons and an isoamylene-fat acid extract phase. The residual hydrocarbon raffinate is removed via conduit 15. The fat acid extract is then passed from the absorbing zone to the reversion zone. The extract is removed via conduit 16 and introduced into first reverter 19. In accordance with this invention, the water required to dilute concentrated make-up sulfuric acid is added to the fat acid extract stream in conduit 16 via conduit 17. Reversion solvent, inert hydrocarbons having a different boiling range than isoamylenes, is also introduced into first reverter 19 via conduits 16 and 30. The inert hydrocarbon solvent for stripping the said acid may be either paraffin or aromatic and may be either lower or higher boiling than the tertiary amylenes, but is preferably higher boiling. The differences in boiling points should be an amount sufficient to enable ready separation of the solvent from the tertiary amylenes by fractionation. A difference in boiling points of at least 15° F. is preferred. Conventionally, solvents such as isobutane, hexane or octane may be employed. The reversion solvent and fat acid extract are intimately contacted in first reverter 19. The mixture is passed to first reverter settler 21 via conduit 20. In settler 21 the mixture separates into an upper extract phase comprising the reversion solvent and isoamylenes which is removed via conduit 22. This extract stream is processed using fractionators and other means not shown to separate the isoamylenes and recover the reversion solvent for recycle. A lower raffinate phase comprising the acid and residual amounts of isoamylenes is recovered in settler 21 and removed via conduit 24. Fresh reversion solvent is added to this acid via conduit 25 and the mixture is introduced into second reverter 26. This reversion solvent may be supplied from an external source but preferably is at least in major part the solvent recovered from the solvent/isoamylene mixture removed through conduit 22. The acid and solvent are intimately contacted in reverter 26 and most of the residual isoamylenes are extracted into the solvent. The mixture is passed via conduit 27 to second reverter settler 29. An upper extract phase comprising the reversion solvent and isoamylenes is separated in settler 29 and recycled to reversion zone feed in conduit 16 via conduit 30. A lower raffinate phase comprising lean acid is separated in settler 29 and recycled to the absorbing zone via conduit 31. A controlled amount of acid is purged through conduit 32 and discarded. Concentrated sulfuric acid, a component of make-up acid, is added to conduit 31 via conduit 34 in accord with this invention. This acid is controlled in amount to balance with the water added earlier via line 17 and thus maintains a steady state acid concentration gradient in the plant. In the preferred steady state operation the water added to the isoamylene-fat acid extract is in an amount sufficient to dilute said added acid essentially to the concentration of the purged acid. In conventional processes, the entire addition of make-up acid, both concentrated sulfuric acid and water, would be made at about the point of conduit 34.

With the present invention a sulfuric acid concentration gradient is established in the extraction system. The acid in the absorption zone is more concentrated than the acid in the reversion zone, since the addition of water to the acid takes place just before the acid enters the reversion zone.

Prior processes maintained a constant acid concentration everywhere in the system. The present variable concentration system gives increased isoamylene recovery efficiency. Since the absorption step of this process operates more efficiently, extracting a greater proportion of the isoamylenes in the feedstock, as acid concentration is raised, while the reversion step operates more efficiently as acid concentration is lowered, the instant process enables a more efficient extraction. In a commercial isoamylene recovery plant, use of the present invention with a normal make-up and injection rate is calculated to result in about a 2% increase in isoamylene recovery. As the make-up acid injection rate is increased in accordance with this invention, an even greater acid concentration gradient is achieved resulting in larger increases in isoamylene recovery.

The two step make-up acid addition of the present invention can be used to advantage with the variety of acid absorption processes disclosed in the art. In such processes, concentration of the acid absorbent is about 50–75% by weight, preferably from about 60 to 70% by weight. Of course, to achieve a worthwhile concentration gradient, the acid added must be more concentrated than the circulating bulk of absorbent acid. It is very suitable for the added acid to have a concentration of 90% or greater, with concentrations of 97% or greater being preferred and 99% or greater concentrations being most preferred. The separately added water is most preferably essentially pure water. If desired, minor amounts of acid, say up to about 10% by weight, may be included in this water.

I claim as my invention:

1. In a continuous process for the recovery of isoamylenes from a mixture consisting essentially of other five-carbon hydrocarbons wherein the hydrocarbon mixture containing isoamylenes is contacted with 50–75% by weight sulfuric acid in an absorption zone to form an isoamylene-fat acid extract which is then contacted with an inert hydrocarbon solvent extractant having a different boiling range than isoamylene in a reversion zone to separate the isoamylenes from the acid and form a lean acid which is then in part purged and replenished by make-up acid and then recycled to the absorption zone, the improvement which comprises adding the make-up acid as two separate components, a 90% by weight or greater concentration sulfuric acid addition to the lean recycle acid and a water addition to the isoamylene-fat acid extract in an amount sufficient to dilute said added acid essentially to the concentration of the purged acid; whereby the concentration of sulfuric acid in the absorption zone is greater than said acid concentration in the reversion zone.

2. The process in accordance with claim 1, wherein the sulfuric acid component of the make-up acid has a concentration of at least 97%.

3. The process in accordance with claim 1, wherein the sulfuric acid component of the make-up acid has a concentration of at least 99%.

References Cited
UNITED STATES PATENTS

| | | | |
|---|---|---|---|
| 3,185,742 | 5/1965 | Sherk et al. | 260—677 A |
| 3,250,820 | 5/1966 | Duthie | 260—677 A |
| 3,542,893 | 11/1970 | Foster et al. | 260—677 A |
| 3,150,201 | 9/1964 | Edwards et al. | 260—677 S |

DELBERT E. GANTZ, Primary Examiner

J. M. NELSON, Assistant Examiner

U.S. Cl. X.R.

260—677 S